United States Patent
Adragna et al.

(10) Patent No.: US 7,864,554 B2
(45) Date of Patent: Jan. 4, 2011

(54) CIRCUIT FOR REDUCING THE VARIATIONS OF AUTO-SUPPLY VOLTAGE OF A CONTROL CIRCUIT OF A SWITCHING POWER SUPPLY

(75) Inventors: Claudio Adragna, Monza (IT); Mauro Fagnani, Nerviano (IT)

(73) Assignee: STMicroelectronics S.R.L., Agrate Brianza (MI) (IT)

(*) Notice: Subject to any disclaimer, the term of this patent is extended or adjusted under 35 U.S.C. 154(b) by 800 days.

(21) Appl. No.: 10/589,038

(22) PCT Filed: Feb. 21, 2005

(86) PCT No.: PCT/EP2005/050737
§ 371 (c)(1), (2), (4) Date: Mar. 20, 2007

(87) PCT Pub. No.: WO2005/086333
PCT Pub. Date: Sep. 15, 2005

(65) Prior Publication Data
US 2007/0274111 A1    Nov. 29, 2007

(30) Foreign Application Priority Data
Mar. 2, 2004 (IT) .......................... MI2004A0383

(51) Int. Cl.
*H02M 7/5383* (2007.01)
*H02M 3/335* (2007.01)
(52) U.S. Cl. .................... 363/74; 363/21.08; 363/21.16
(58) Field of Classification Search .................... 363/49, 363/74, 21.08, 21.16
See application file for complete search history.

(56) References Cited

U.S. PATENT DOCUMENTS

| | | | |
|---|---|---|---|
| 5,424,932 A | 6/1995 | Inou et al. | |
| 5,459,652 A * | 10/1995 | Faulk | 363/49 |
| 5,841,641 A * | 11/1998 | Faulk | 363/21.14 |
| 5,986,897 A * | 11/1999 | Majid et al. | 363/21.16 |
| 7,035,119 B2 * | 4/2006 | Koike | 363/21.18 |
| 2003/0016545 A1 * | 1/2003 | Jutras et al. | 363/18 |

FOREIGN PATENT DOCUMENTS

DE    195 37 876 A1    4/1996

OTHER PUBLICATIONS

PCT Search Report and Written Opinion No. PCT/EP2005/050737, Aug. 19, 2005.

* cited by examiner

*Primary Examiner*—Bao Q Vu
*Assistant Examiner*—Jue Zhang
(74) *Attorney, Agent, or Firm*—Hogan Lovells US LLP

(57) ABSTRACT

A circuit for reducing the variations of auto-supply voltage of a control circuit of a switching power supply, where the control circuit supplies an activation or deactivation signal of a power transistor, includes an auto-supply voltage generator, a controlled switch capable of selectively connecting the generator to the control circuit, and a driving circuit of the controlled switch that supplies a closing signal of the controlled switch after a predefined delay of time starting from the deactivation command.

14 Claims, 3 Drawing Sheets

CIRCUIT FOR REDUCING THE VARIATIONS OF AUTO-SUPPLY VOLTAGE OF A CONTROL CIRCUIT OF A SWITCHING POWER SUPPLY

RELATED APPLICATION

The present application is a U.S. national filing and claims priority of PCT/EP2005/050737 filed Feb. 21, 2005, which claims priority of Italian Patent Application No. MI2004A000383 filed Mar. 2, 2004, both of which applications are incorporated herein in their entireties by this reference.

FIELD OF THE INVENTION

The present invention refers to switching power supplies and in particular to a circuit for reducing the variations of auto-supply voltage of a control circuit of a switching power supply.

More precisely, it refers to a method and to a circuit, to be made completely or partially in an integrated form, applicable to pulse width modulation (PWM) integrated control circuits, used in network converters.

BACKGROUND

Network converters such as those described above, are fitted with a transformer and a switch (typically MOSFET) that periodically connects a transformer winding to the input source, that is to a network voltage rectified by a diode bridge and filtered by a capacitor.

Converters need a control circuit that determines the turn-on and turn-off times of the MOSFET so as to supply the load with the power required, at a preset and stabilised voltage. These functions are normally mainly incorporated in an integrated circuit together with the others, that guarantee correct functioning of the converter also in the phases of turn-on and turn-off, and to prevent catastrophic breakdowns if the converter is brought to work outside the scheduled functioning conditions.

For all these reasons integrated control circuits are normally fitted with the function normally called Undervoltage Lockout (UVLO).

A typical circuit as that mentioned above is shown schematically in FIG. 1.

The network voltage Vac is applied by activation of the switch SW to a diode bridge 10, and then to a filter capacitor Cf. The voltage Vin, at the terminals of the capacitor Cf, is applied to the start-up circuit 11, which in the simplest case is constituted by a resistance, and supplies a current Is. The current Is loads a capacitor Cs. The voltage coming from a secondary Wa of the power supply transformer is also applied to the capacitor Cs, through a resistance Rr and a diode D. A fraction Iq of the current Is supplies the integrated control circuit 12. It is applied both to the block UVLO 13, and to the drive circuit 14 of the power supply, that supplies the command voltage Vg to the power MOSFET. The block UVLO 13 comprises a comparator 15 with hysteresis that compares its supply voltage Vcc, with a start-up voltage Vss. The output voltage of the comparator 15 commands a commanded switch SW1 that opens or closes the supply of the drive circuit 14. The voltage Vin is the voltage that will be applied to the power switch of the power supply.

The supply network Vac is applied to the power supply by closing the switch SW and the filter capacitor Cf is loaded in very few milliseconds at the peak network voltage, giving origin to the voltage Vin.

The start-up circuit 11 supplies a current Is that partially loads the capacitor Cs, while a part Iq is absorbed by the integrated control circuit 12. The absorption Iq of the latter in these conditions is very small as the circuit UVLO 13 keeps the switch SW1 open. The current supplied by the start-up circuit 11 thus goes mainly to load the capacitor Cs thereby increasing the voltage Vcc at its terminals.

The voltage Vcc continues rising until it reaches the start-up value Vss, in a time that is variable usually from several hundred of milliseconds to a few seconds. In all this time the drive circuit 14 remains off, and its output voltage Vg, driving the gate of the MOSFET, remains at zero. As soon as the voltage Vcc reaches the voltage Vss, the comparator 15 closes the switch SW1, therefore the current Iq increases considerably; the drive circuit of the MOSFET is enabled and the activity of the power supply starts.

The increased consumption of the device is not supported by the start-up circuit 11 so that there is a rapid decrease of Vcc. This is the reason why the comparator of the circuit UVLO 13 has a hysteresis. To turn the drive circuit 14 off again and to return to the conditions that were present before the start the Vcc has to go down below a second threshold Vstop<Vss, called exactly UVLO. If this hysteresis was not present there would be a continual alternation of turn-ons and turn-offs.

In the meantime, by effect of the switching of the MOSFET, the output voltage of the power supply increases rapidly and with it the voltage of the winding Wa, proportional to it, coupled to the transformer driven by the MOSFET. The winding Wa, the resistance Rr, the diode D and the capacitor Cs, constitute the circuit commonly indicated with the name of auto-supply, the task of which is to support the functioning of the integrated circuit at normal operation. The number of turns of the winding Wa is to be chosen suitably so that the voltage generated by it is greater than Vstop, and the capacitor Cs is to be chosen suitably so that the voltage generated by the winding Wa becomes greater than the voltage Vstop before the voltage Vcc becomes less than the voltage Vstop.

The presence of the voltage threshold Vstop also ensures a defined and safe operation during the turning-off phase. In fact, by opening the switch SW the power supply is fed at the expense of the load present in the capacitor Cf, so that its voltage falls rapidly. As soon as this becomes insufficient to keep the power supply active with the load applied at that moment, the output voltage will diminish rapidly and, with it, Vcc, until it falls lower than the voltage Vstop. As soon as this happens the drive circuit 14 is turned off, Iq returns to its very low initial value, Vg goes to zero and the MOSFET turns off.

Ideally, the voltage generated by the winding Wa, present at the terminals of the capacitor Cs, is hooked through the turns ratio of the transformer to the regulated output voltage and therefore it is also kept regulated by the regulating system. In the actual operation this is quite close to being true, upon variation of the input voltage of the power supply, while the situation is very different upon variation of the load.

This is mainly due to the parasitic parameters of the transformer, by effect of which with high load the voltage rises far more than scheduled by effect of the peaks present on the positive fronts of the voltage on Wa, while with low or negligible load, where the peaks are much lower and the load on Wa is represented by the integrated control circuit 12, can also be greater than that in output, the voltage diminishes considerably below the expected value.

In the more modern integrated control circuits 12, this is accentuated by the adoption of several special techniques aimed at minimizing the consumptions of the power supply at low loads so as to facilitate compliance with the most recent regulations regarding the reduction of consumption of equipment in non-operative conditions (for example EnergyStar, Energy2000, Blue Angel, etc.). These techniques basically entail the reduction of the operative frequency of the power supply at minimum or negligible loads; therefore the energy that Wa is capable of transferring is diminished.

Another problem is represented by the fact that the voltage Vcc cannot exceed a determined value Vccmax for questions linked to the technology of the integrated control circuit 12 that impose limits to the voltage applicable to it and, at the same time, in conditions of minimum or negligible load, Vcc has to stay greater than Vstop, otherwise the system will function intermittently. The variations of the voltage generated by Wa are therefore limited, with some margin of safety, within the interval Vstop–Vccmax.

In addition, in short circuit conditions, the peaks generated on Wa are particularly high and can be sufficiently energetic to keep the Vcc above Vstop, where, ideally, the voltage generated by Wa should be close to zero.

To limit the phenomenon of over-high voltage at maximum load and to ensure intermittent operation in short circuit conditions, as well as optimising the constructive methods of the transformer, generally the resistance Rr is used in series with the diode D with the purpose of smoothing the peaks. Sometimes, as an alternative, a small inductor is used. However, both solutions accentuate the decrease of Vcc at minimum or negligible loads. Also optimising the value of this resistor or inductor (that is, using the minimum value) so as to ensure functioning in safe conditions both at maximum load (Vcc<Vccmax) and in short circuit (Vcc<Vstop), it is difficult to fulfil the condition Vcc>Vstop at minimum or negligible load. To resolve this latter problem a ballast load is added to the power supply so as to contrast the decrease of Vcc. This, however, worsens the efficiency of the system and, above all, makes it practically impossible to comply with the various EnergyStar, Energy2000, Blue Angel, etc.

The same also goes for other external circuitry solutions intended for minimizing the effect of the peaks. In all, meeting the conditions Vcc<Vccmax at full load and Vcc<Vstop in short circuit, makes it extremely difficult to also fulfil the condition Vcc>Vstop at minimum or negligible load.

To minimize the effects of the variations of Vcc it is necessary to extend the interval Vstop–Vccmax as far as possible. Nevertheless, if Vccmax is sufficiently high it is not difficult to fulfill the condition at zero load increasing the number of turns of Waux which however, at high load, produces high voltage which, even though tolerable by the integrated circuit, can easily present problems of power dissipation internally (equal to the product Vcc·Iq), without taking into account the fact that a high Vccmax entails the use of costly technology. If Vstop is very low (compatibly with the safety limits for driving the MOSFETs) it will be easier to fulfill the zero load condition, however it will be difficult to fulfill the condition on the short circuit.

To improve the stability of the voltage Vcc, a possible solution is that shown in FIG. 2. The emitter of a PNP type Transistor T is connected to the transformer Wa, its base is connected to ground by means of a resistance R A capacitor C is connected between the base and the emitter of the Transistor T. The collector of the transistor T is connected to the anode of a diode D, whose cathode is connected to the clamping capacitor Cs and then to the integrated control circuit 12.

On the positive fronts of the voltage generated by Waux the capacitor C filters the peaks.

This system effectively stabilizes the Vcc starting from low loads up to full load and ensures that the condition Vcc<Vstop in short circuit for the converter can be easily obtained. At very low or negligible load, however, it cannot keep the Vcc stable, that decreases considerably, worse than in the case of the circuit of FIG. 1. In fact, the transistor T introduces an additional fall of voltage (Vcesat) and, above all, masks partially or completely the horizontal section of the voltage of Waux which is very short. On the contrary to what happens at full load, in these conditions the pulses, even though being small, would give a small addition of energy capable of obstructing, at least partially, the tendency of Vcc to decrease.

SUMMARY OF THE INVENTION

In view of the state of the technique described, object of the present invention is to provide a circuit that does not have the inconveniences of the known art, and in particular is capable of minimizing the variations of the auto-supply voltage of control circuits.

In accordance with the present invention, this object is achieved by means of a circuit for reducing the variations of auto-supply voltage of a control circuit of a switching power supply where said control circuit supplies an activation or deactivation signal for a power transistor comprising: a generator of said auto-supply voltage; characterised in that it comprises a controlled switch capable of selectively connecting said generator to said control circuit; and a driving circuit of said controlled switch that supplies a closing signal of said controlled switch after a predefined time delay starting from said deactivation command.

This object is also achieved by means of a switching power supply comprising a circuit for reducing the variations of the auto-supply voltage of the control circuit of a switching power supply including a generator of said auto-supply voltage, a controlled switch capable of selectively coupling said generator to said control circuit, and a driving circuit of said controlled switch that supplies a closing signal of said controlled switch after a predefined time delay starting from said deactivation command.

In addition, this object is achieved by means of a method for reducing the variations of the auto-supply voltage of a control circuit of a switching power supply where said control circuit supplies an activation or deactivation command signal of a power transistor characterised in that it selectively connects the secondary of the transformer of said switching power supply to said control circuit after a predefined delay of time starting from said deactivation command.

According to the present invention it is possible to produce a circuit capable of minimizing the variations of the auto-supply voltage of control circuits that guarantees safety in functioning in short-circuit conditions (Vcc<Vstop), that facilitates achieving compliance to the regulations regarding consumption of equipment at minimum or negligible load (Vcc>Vstop), that simplifies the construction of the transformer and of the auxiliary winding, and is capable of protecting from overloads in output, that is, capable of turning off the converter when the overload lasts longer than a predefined time.

BRIEF DESCRIPTION OF THE DRAWINGS

The characteristics and the advantages of the present invention will appear evident from the following detailed description of an embodiment thereof, illustrated as non-limiting example in the enclosed drawings, in which.

DETAILED DESCRIPTION

Figure 3:
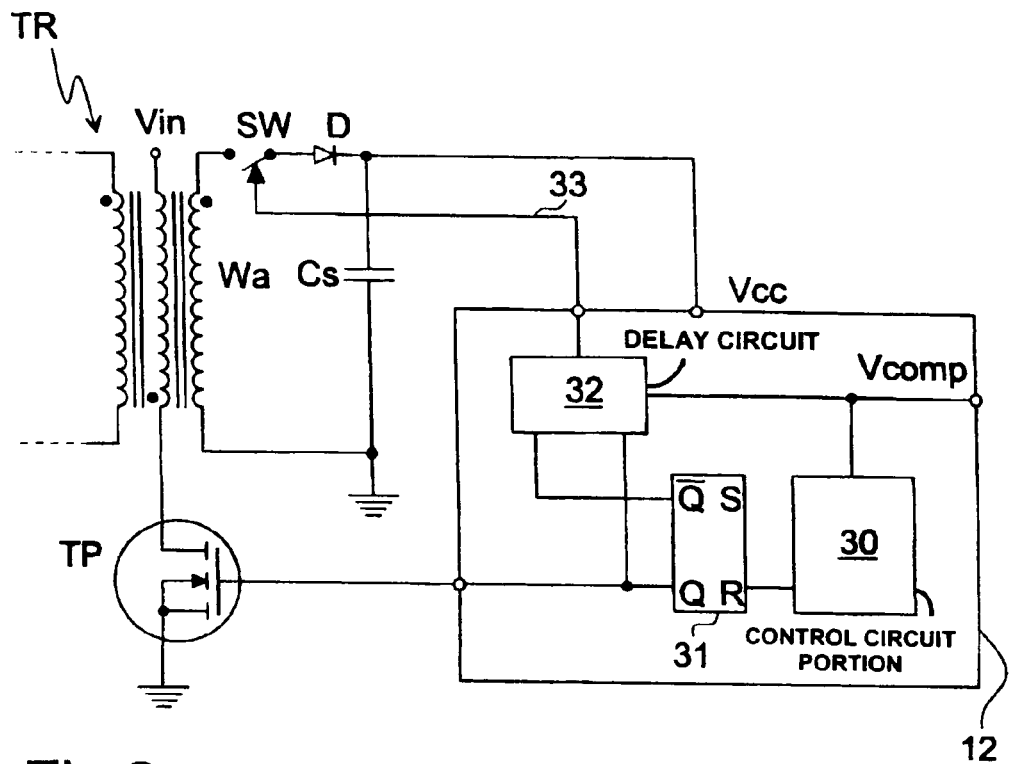
FIG. 3 shows schematically a circuit for reducing the variations of auto-supply voltage of a control circuit of a switching power supply.

FIG. 3 shows the transformer TR of a switching power supply fed by the voltage Vin, and connected to a power transistor TP. A terminal of the secondary Wa of the transformer TR is connected to a controlled switch SW, then to a diode D and to a terminal of a capacitor Cs. The voltage at the terminals of the capacitor Cs is the supply voltage Vcc of the integrated control circuit 12.

The integrated control circuit 12 comprises a circuit 30 for managing it to which is connected a circuit FLIP-FLOP 31 that supplies the command signal Q (and Q-negated) for driving the transistor TP. The signals Q and Q-negated are supplied to a delay circuit 32. A signal Vcomp is also supplied to this circuit.

The voltage Vcomp is the voltage at the output of the error amplifier, used in the power supply, and that is commonly indicated as "control voltage", as it controls the power supply determining the values of the turn-on and turn-off times of the power transistor TP. Said voltage, within the limits of its dynamics, is proportional to the load applied to the power supply and therefore is taken as indicative signal of the load conditions. Other voltages indicative of the load conditions in output of the power supply can be used. Following the increase of the load the voltage Vcomp increases, and following the decrease of the load, the voltage Vcomp decreases.

The delay circuit 32 supplies the command voltage 33 of the switch SW.

Figure 4:
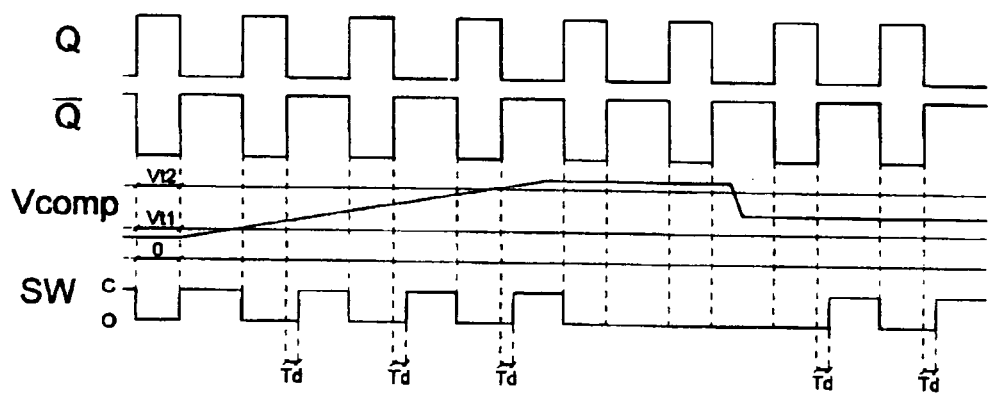
FIG. 4 shows a time diagram where the main signals related to the block diagram of FIG. 3 are shown.

The description now follows of the functioning of the circuit represented in FIG. 3 with the aid of the time diagrams of FIG. 4, where the signals Q and Q-negated, the voltage Vcomp, the delay time Td, and the opening O and the closing C of the switch SW are represented.

The object of the circuit of FIG. 3 is to drive the switch SW, placed in series to the auxiliary winding Wa, in opposition of phase with the power transistor TP and delaying its turn-on, in relation to the turn-off of the power transistor TP itself, by a time subject to a representative signal of the load conditions of the converter so that said delay is minimum or negligible when the above-mentioned signal indicates a load lower than a predefined value Vt1 and that assumes suitable values so as to mask the pulses of Wa when the abovementioned signal indicates a load greater than said value.

Optionally, it can be foreseen that when the signal representative of the load of the converter indicates an overload condition (Vcomp>Vt2) the switch SW can also not be on. This would enable the converter to be turned off after a period of time equal to that needed for the voltage Vcc to go below the voltage Vstop. Overloads that last less than this time would instead leave the converter always on.

This permits the protection to be extended also to those situations of overload that are not real short-circuits, in which the output voltage loses the regulation by effect of the current limitation circuits, consequently also making the voltage Vcc decrease but not below Vstop, therefore the functioning of the converter does not become intermittent. In these conditions, even though the power is limited, the output currents can be much greater than the maximum in normal working. If the output stages are not thermally dimensioned to support this condition they face destruction after a short time. It can be understood how a protection of this type increases the functioning safety and enables the output stages to be dimensioned without having to take anomalous conditions into account.

In regard to the practical implementation, it would be better if this were carried out inside the integrated control circuit. In principle the integration could be total, that is, the switch SW could also be integrated. In this case several problems arise. Two available pins of the device are needed, one to connect to an end of the winding Wa and the other, which would be the pin supplying the chip, would be connected to the capacitor Cs. The pin to connect to Wa can also take on a voltage of several tens of negative volts in relation to ground, therefore either it is necessary for the pin to be structured so as to support these heavy negative voltages or a diode (with cathode turned towards the pin) has to be interposed that insulates the pin when the voltage on Wa is negative. The current that flows through SW is the impulse type; even though its average value does not go over several mA, it flows for a rather small fraction of the cycle so the impulse value can also be much greater. It follows then that SW should be capable of supporting the impulse current with a minimum fall of voltage and its dimensions could be anything but insignificant.

These problems need to be assessed in the light of the availability of pins and of the technologies used on the silicon in determining the impact on the dimensions of the chip and, in other words, on the cost.

Another approach could provide for the switch SW being external to the integrated circuit and that latter having a pin dedicated to driving the switch. Certainly this approach, even though needing two additional external components, is less demanding for the silicon of the integrated circuit and could reveal to be economically more convenient.

The switch could be any transistor BJT or FET. With BJTs, the use of a PNP is more convenient: with NPN there would be a drop equal to at least one Vbe, while with the PNP there would be only one Vcesat. Equivalently, use could be made of a JFET with N channel or a MOSFET (at enhancement) with P channel (the JFET with P channel or the MOSFET with N channel would require the presence of a voltage greater than Vcc, which could be an inconvenient complication). Further ahead, as non-limiting example, a PNP type BJT will be used for convenience.

The relation between the introduced delay in turn-on Td and Vcomp can be of any type as long as Td is minimum or negligible at low load, that is when Vcomp is lower than a threshold Vt1. Optionally the turn-on of SW2 could be inhibited in overload conditions, that is when Vcomp is higher than a threshold Vt2. In the interval Vt1-Vt2, Td can be constant or, more generally, non-digressive function of V(COMP).

Figure 5:
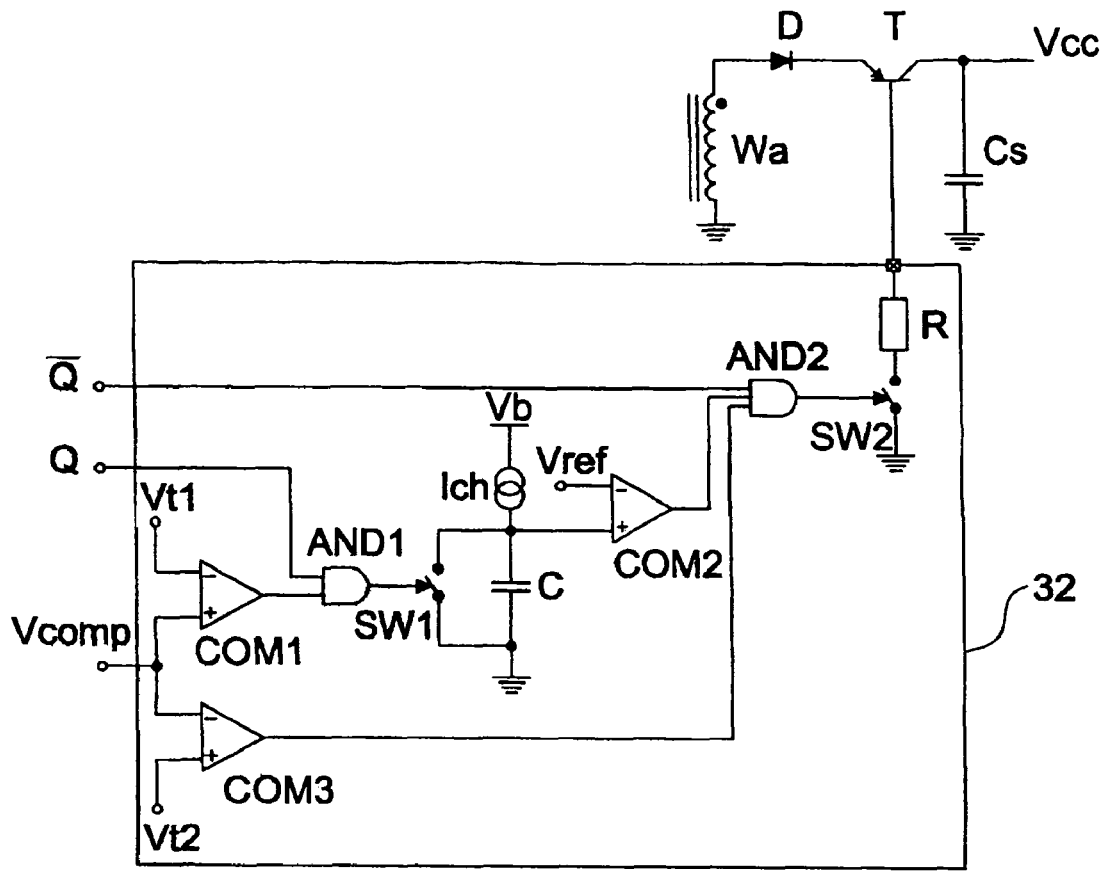
FIG. 5 shows a possible embodiment of the block diagram of FIG. 3.

A possible practical embodiment of the delay circuit 32 is shown in FIG. 5.

The transformer Wa is connected to the anode of a diode D whose cathode is connected to the emitter of a PNP type Transistor T, its base is commanded by the delay circuit 32. In particular it is connected to a resistance R and then to a controlled switch SW2 connected to ground. The collector of the transistor T is connected to the clamping capacitor Cs that supplies the voltage Vcc to the integrated control circuit 12.

The signal Q-negated is connected to a first gate of the circuit AND2, whose output commands the switch SW2, if the output signal is high it closes the switch SW2, if the signal is low it opens the switch SW2.

The signal Q is connected to a first gate of the circuit AND1, whose output commands a controlled switch SW1. The switch SW1, upon command, short circuits a capacitor C, placed in parallel to it. The capacitor C has a first terminal connected to ground and a second terminal connected to a current generator Ich supplied by the voltage Vb.

Optionally, the current generator Ich supplies a current dependent on the value of the voltage Vcomp.

The second terminal of the capacitor C is also connected to a non-inverting input of a comparator-COM2, whose output is connected to a second gate of the circuit AND2, a reference voltage Vref is connected to the inverting input of the comparator COM2.

The signal Vcomp is connected to the non-inverting input of a comparator COM1, a reference voltage Vt1 is applied to the inverting input of the comparator COM1, its output is connected to the second gate of the circuit AND1.

Optionally, a comparator COM3 is present which has the signal Vcomp applied at its inverting input, and a reference voltage Vt2 is applied at its non-inverting input, and its output is connected to a third gate of the circuit AND2.

Assuming that Vt1<Vcomp<Vt2, so that the outputs of the comparators COM1 and COM3 are high, it can be observed that at the moment of turn-on of the transistor TP, that is when Q goes high and Q-negated goes low, the switch SW2 is immediately opened by the low output of the gate AND2 that commands it, with this opening the base of T and turning it off. Simultaneously, high Q closes the switch SW1 rapidly discharging the time capacitor C and ensures that the output of the comparator COM2 goes low. As soon as the check loop commands the turn-off of the transistor TP, that is as soon as Q goes low and Q-negated goes high, SW1 is opened and the current generator Ich starts loading the capacitor C with a current which possibly is dependent on the value of Vcomp. The output of AND2 remains low until the voltage on C reaches the reference value Vref, then COM2 switches and its output goes high, with this determining the closing of SW2 and thus the turn-on of T with a delay Td equal to:

$$Td = \frac{Vref}{Ich}C$$

If Vcomp<Vt1 the output of COM1 is low, so also the output of AND1 is low, independently from the state of Q. SW1 is thus always open and the generator Ich loads C until the voltage Vb>Vref. The output of COM2 is thus always high, therefore the delay is eliminated and SW2 is commanded directly by Q-negated.

If Vcomp>Vt2 the output of COM3 is low, therefore the output of AND2 is low, independently from the state of the other inputs and SW2 always remains open, with this also leaving T always open. Consequently Vcc will decline with a speed depending on the capacitor Cs and on the consumption of the integrated control circuit 12. As soon as Vcc<Vstop, the integrated control circuit 12 turns off. The consumption of the power supply decreases therefore, by effect of the current supplied by the start-up circuit, Vcc again starts to increase until it exceeds Vstart, and the integrated control circuit 12 turns on again and the converter starts up again. If the overload is still present Vcomp goes back above Vt2 and the cycle mentioned before starts again. Thus, intermittent functioning results, with consequent drastic reduction of the average power in question and of the stress of the output stages of the converter. In addition, if the overload were removed, seeing the converter continuously tries to start up again, the system would be capable of picking up its normal functioning without external interventions.

It is clear that, if Vcomp should return below Vt2 before Vcc<Vstop, the transistor T would start again to be driven and the Vcc would be rapidly reset at its nominal value, without interruption in functioning, thus giving immunity to the system against the brief accidental overloads.

Figure 1:
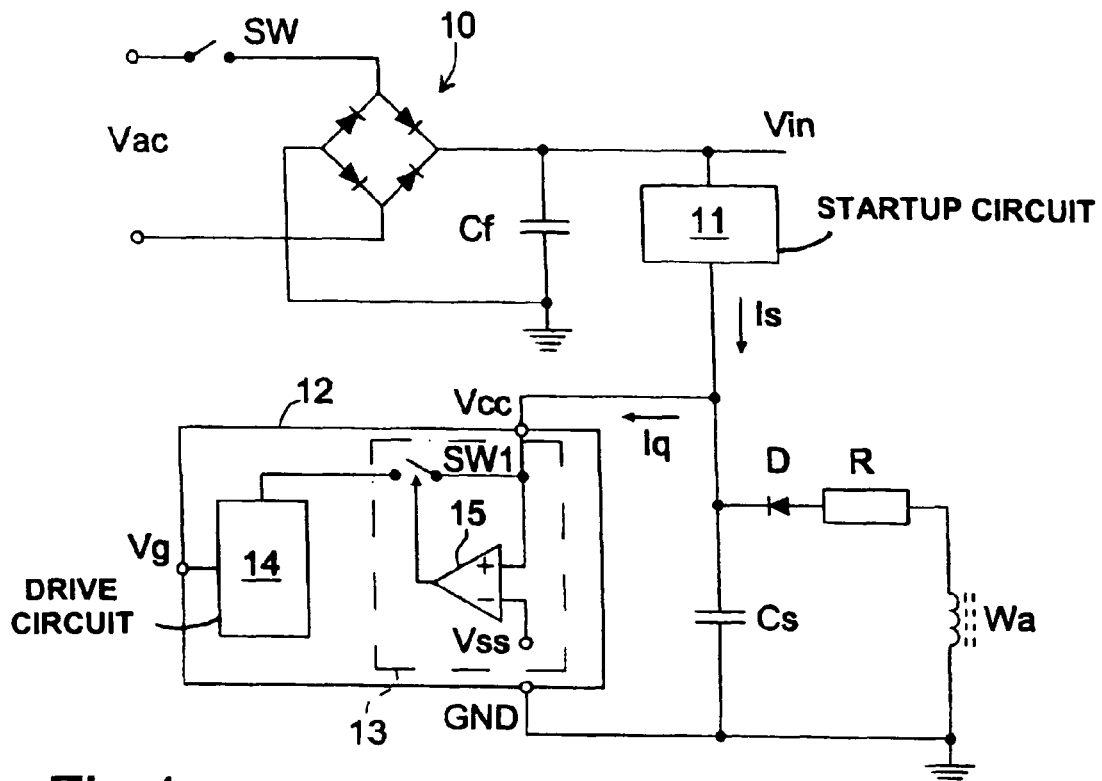
FIG. 1 shows schematically part of an integrated control circuit of a switching power supply in accordance with the known art.
Figure 2:
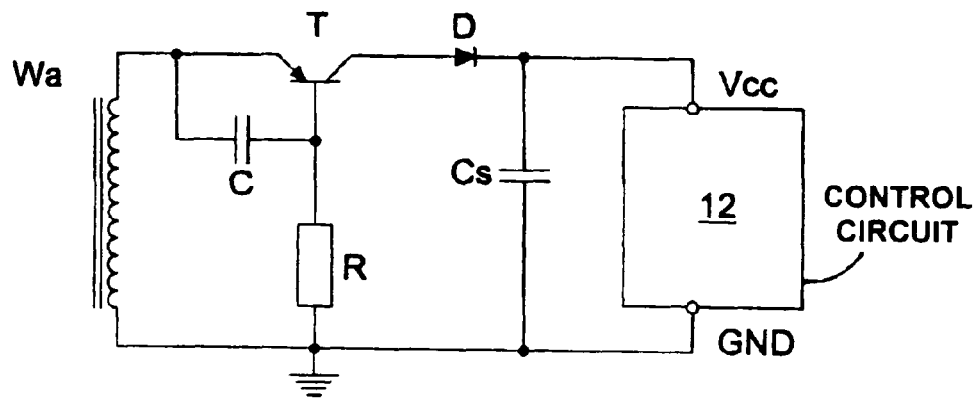
FIG. 2 shows schematically a circuit capable of minimizing the variations of the auto-supply voltage of the integrated control circuits.
Figure 6:
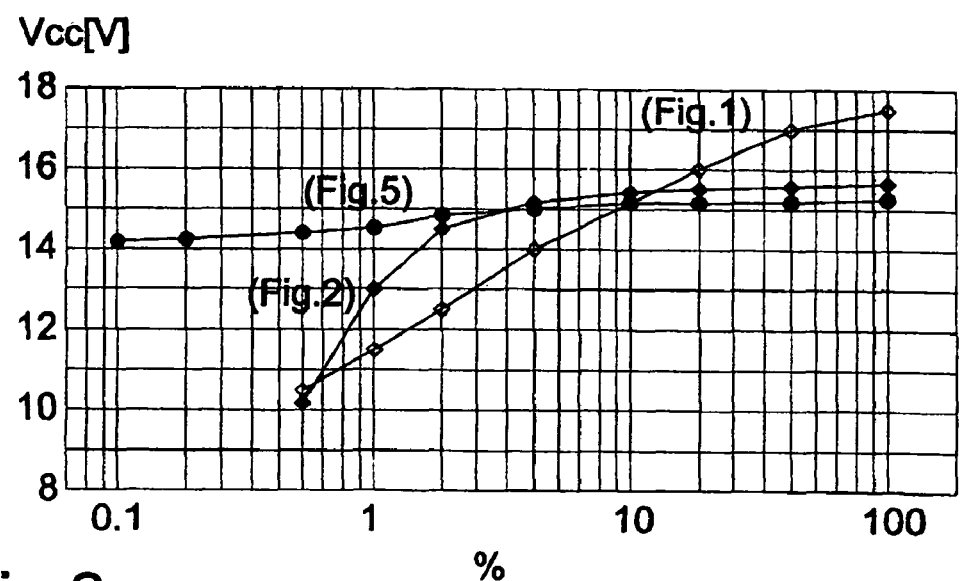
FIG. 6 shows in a diagram the results of the performances of the circuits of FIGS. 1, 2 and 5.

The performances of the circuit of FIG. 5 have been assessed and compared in the same system (a 30 W flyback converter with universal input voltage) with those of the circuits shown in FIGS. 1 and 2 by means of simulations. The results are summed up in the diagrams of FIG. 6, which give the voltage Vcc generated by the auto-supply system in function of the load, normalized at its nominal value. The performances of the circuit of FIG. 1, shown by the curve with white diamond shapes, give place to the most consistent variation, while those of FIG. 2, shown by the curve with the black diamond shapes, are good up to a load of about 2% of the nominal load, after which the voltage Vcc declines dramatically, even below that generated by the circuit of FIG. 1. Neither can maintain the voltage above the turn-off threshold of the integrated control circuit for load values lower than 0,5% of the nominal load.

With the circuit of FIG. 5, whose performances are shown by the curve with the stars, the variation of Vcc is around 1V up to a load of 0,1% of the nominal load.

The invention claimed is:

1. A circuit to reduce the variations of an auto-supply voltage of a control circuit of a switching power supply wherein said control circuit supplies an activation or deactivation signal for a power transistor comprising:
   a generator of said auto-supply voltage;
   a controlled switch capable of selectively coupling said generator to said control circuit;
   a driving circuit of said controlled switch that supplies a closing signal of said controlled switch after a predefined time delay starting from said deactivation command; and
   a first comparator that compares a voltage proportional to the load of said switching power supply with a first reference voltage, said predefined time delay being substantially zero when said voltage proportional to the load of said switching power supply is lower than said first reference voltage.

2. The circuit of claim 1 further comprising a circuit generator that generates said predefined time delay.

3. The circuit of claim 2 wherein said circuit generator generates said predefined time delay proportionally to a voltage proportional to the load of said switching power supply.

4. The circuit of claim 1 further comprising a second comparator that compares the voltage proportional to the load of said switching power supply with a second reference voltage, said controlled switch remaining open when said voltage proportional to the load of said switching power supply is higher than said second reference voltage.

5. The circuit of claim 1 wherein said driving circuit of said controlled switch supplies an opening signal of said controlled switch starting from said activation command.

6. The circuit of claim 1 wherein the controlled switch comprises a PNP transistor.

7. A method for reducing the variations of an auto-supply voltage of a control circuit of a switching power supply wherein said control circuit supplies an activation or deactivation signal for a power transistor comprising selectively coupling the secondary of a transformer of said switching supply to said control circuit after a predefined delay time starting from said deactivation command and wherein the control circuit comprises a comparator that compares a voltage proportional to the load of said switching power supply with a reference voltage, said predefined delay time being substantially zero when said voltage proportional to the load of said switching power supply is lower than said reference voltage.

8. A switching power supply including a circuit to reduce the variations of an auto-supply voltage of a control circuit of the switching power supply wherein said control circuit supplies an activation or deactivation signal for a power transistor comprising:
- a generator of said auto-supply voltage;
- a controlled switch operable for selectively coupling said generator to said control circuit;
- a driving circuit of said controlled switch that supplies a closing signal of said controlled switch after a predefined time delay starting from said deactivation command; and
- a first comparator that compares a voltage proportional to the load of said switching power supply with a first reference voltage, said predefined time delay being substantially zero when said voltage proportional to the load of said switching power supply is lower than said first reference voltage.

9. The switching power supply of claim 8 further comprising a circuit generator that generates said predefined time delay.

10. The switching power supply of claim 9 wherein said circuit generator generates said predefined time delay proportionally to a voltage proportional to the load of said switching power supply.

11. The switching power supply of claim 8 further comprising a second comparator that compares the voltage proportional to the load of said switching power supply with a second reference voltage, said controlled switch remaining open when said voltage proportional to the load of said switching power supply is higher than said second reference voltage.

12. The switching power supply of claim 8 wherein said driving circuit of said controlled switch supplies an opening signal of said controlled switch starting from said activation command.

13. The circuit of claim 8 wherein the controlled switch comprises a PNP transistor.

14. A method for reducing the variations of an auto-supply voltage of a control circuit of a switching power supply wherein said control circuit supplies an activation or deactivation signal for a power transistor comprising selectively coupling a secondary of a transformer of said switching supply to said control circuit after a predefined delay time starting from said deactivation command and wherein the control circuit comprises a comparator that compares the voltage proportional to the load of said switching power supply with a reference voltage, said power transistor remaining open when said voltage proportional to the load of said switching power supply is higher than said reference voltage.

* * * * *